United States Patent
Tajima (10) Patent No.: US 8,007,151 B2
(45) Date of Patent: Aug. 30, 2011

(54) VEHICLE HEADLIGHT

(75) Inventor: Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 127 days.

(21) Appl. No.: 12/609,710

(22) Filed: Oct. 30, 2009

(65) Prior Publication Data

US 2010/0110713 A1      May 6, 2010

(30) Foreign Application Priority Data

Oct. 31, 2008   (JP) ................. 2008-282119

(51) Int. Cl.
*F21V 19/02* (2006.01)
*B60Q 1/00* (2006.01)

(52) U.S. Cl. ........ 362/523; 362/524; 362/526; 362/531; 362/464; 362/465; 315/82

(58) Field of Classification Search ............. 362/523, 362/524, 526, 530–532, 464, 465, 466, 507, 362/285, 386, 272; 315/82
See application file for complete search history.

(56) References Cited

U.S. PATENT DOCUMENTS

| | | | | |
|---|---|---|---|---|
| 4,333,131 | A * | 6/1982 | Hujimoto et al. | 362/549 |
| 6,478,457 | B1 | 11/2002 | Manley | |
| 7,175,319 | B2 * | 2/2007 | Tajima et al. | 362/465 |
| 2004/0085780 | A1 * | 5/2004 | Hayami | 362/523 |
| 2008/0089086 | A1 * | 4/2008 | Tajima et al. | 362/524 |

FOREIGN PATENT DOCUMENTS

| | | |
|---|---|---|
| EP | 1 772 311 A1 | 4/2007 |
| JP | 2008-094275 A | 4/2008 |

OTHER PUBLICATIONS

Extended European Search Report for European Application No. 09172488.0-2423 dated Jan. 27, 2010, 5 pages.
English abstract of Japanese Publication No. 2008-94275 published on Apr. 24, 2008, esp@cenet database, 1 page.

* cited by examiner

*Primary Examiner* — Ali Alavi
(74) *Attorney, Agent, or Firm* — Osha • Liang LLP (57) ABSTRACT

A vehicle head light includes a lighting casing; a lamp unit disposed in the lighting casing; a support member that supports the lamp unit so as to be rotatable at least in two directions; and an actuator that rotates the lamp unit with respect to the support member. The lighting casing includes a lamp housing opened on one side and a cover that closes the opening of the lamp housing. The lamp unit includes a light source and a reflector that reflects light emitted from the light source. The actuator is disposed under the lamp unit. A lower end of the lamp unit is coupled to the actuator. The actuator includes a support portion attached to the support member; and a main unit being supported by the support portion so as to be movable in a front-rear direction. The support portion includes a shaft holding portion on a lower surface thereof. The main unit includes a bearing portion on an upper surface thereof. A driving mechanism is provided in the main unit. The driving mechanism includes a connecting shaft to which the lamp unit is coupled. A guide shaft is inserted through the shaft holding portion of the support portion and the bearing portion of the main unit. The guide shaft guides the main unit when the main unit moves in the front-rear direction with respect to the support portion of the main unit.

11 Claims, 9 Drawing Sheets

VEHICLE HEADLIGHT

BACKGROUND OF THE INVENTION

1. Field of the Invention

The present invention relates to a vehicle headlight. More specifically, the present invention involves reducing the size in the right-left direction of an actuator that rotates a lamp unit in a predetermined direction, by moving a part of the actuator through a guide shaft.

2. Background Art

Examples of vehicle headlights include lamp units having a light source and a reflector that reflects light emitted from the light source disposed in a lighting casing constituted by a cover and a lamp housing.

Such vehicle headlights include a type in which the lamp unit is supported by a support portion such as a frame or a bracket so as to be rotatable (tiltable) and the lamp unit is rotated by the driving force of an actuator (see, for example, Patent Reference 1).

Patent Reference 1: JP-A-2008-094275

By the lamp unit being rotated (tilted) in the vertical direction by the actuator, a so-called leveling adjustment is performed to adjust for the optical axis shift that varies depending on the weight of the load on the vehicle. Also, by the lamp unit being rotated in the right-left direction by the actuator, a so-called swivel operation is performed to change the direction of the optical axis so as to follow the running direction of the vehicle.

In the above-described vehicle headlight that performs the leveling adjustment by the actuator, the actuator is disposed below the lamp unit, the lower end of the lamp unit is coupled to a connecting shaft provided on the actuator, and a supporting point (spherical portion) serving as the supporting point of rotation for the leveling adjustment is provided at the upper end of the lamp unit. In the leveling adjustment, by the lower end being moved in the front-rear direction by the driving force of the actuator, the lamp unit is rotated in the vertical direction about the supporting point.

In the vehicle headlight described in Patent Reference 1, the actuator includes a main unit having a driving mechanism and a support portion that supports the main unit so as to be movable in the front-rear direction. The connecting shaft is provided as a part of the driving mechanism. In the main unit, a slide rail that protrudes sideward (outward) is provided on each of the right and left side surfaces. In the support portion, a side wall, which supports the slide rail so as to be slidable, is provided on each of the right and left sides. The side walls are situated on a side (outer side) of the respective slide rails to support the slide rails.

In the leveling adjustment, the main unit is moved in the front-rear direction with respect to the sliding portion by the slide rails being guided by the side walls of the support portion, and the lamp unit is rotated in the vertical direction with the movement of the main unit in the front-rear direction.

However, in the vehicle headlight described in Patent Reference 1, as described above, the slide rails provided on the main unit of the actuator protrude sideward (outward), and the side walls provided on the support portion are situated on a side (outside) of the slide rails to support the slide rails.

Consequently, the width in the right-left direction of the actuator is large. That is, because the slide rails and the side walls protrude sideward (outward), the size of the actuator is increased in the right-left direction.

SUMMARY OF THE INVENTION

In one or more embodiments, the vehicle headlight of the present invention reduces the size in the right-left direction of the actuator.

In one or more embodiments, a vehicle headlight is provided with: a lighting casing including a lamp housing opened on one side and a cover that closes the opening of the lamp housing; a lamp unit disposed in the lighting casing, and having a light source and a reflector that reflects light emitted from the light source; a support member that supports the lamp unit so as to be rotatable at least in two directions; and an actuator that rotates the lamp unit with respect to the support member and is disposed under the lamp unit, and to which a lower end of the lamp unit is coupled, the actuator includes: a support portion attached to the support member and having a shaft holding portion on a lower surface thereof; and a main unit being supported by the support portion so as to be movable in a front-rear direction and having a bearing portion on an upper surface thereof, a driving mechanism having a connecting shaft to which the lamp unit is coupled is provided in the main unit, and a guide shaft is provided that is inserted through the shaft holding portion of the support portion and the bearing portion of the main unit and guides the main unit when the main unit moves in the front-rear direction with respect to the support portion of the main unit.

Thus, in the vehicle headlight, the guide shaft that guides the main unit when the main unit moves in the front-rear direction is disposed between the support portion and the main unit disposed above and below.

The vehicle headlight in accordance with one or more embodiments of the present invention is provided with: a lighting casing including a lamp housing opened on one side and a cover that closes the opening of the lamp housing; a lamp unit disposed in the lighting casing, and having a light source and a reflector that reflects light emitted from the light source; a support member that supports the lamp unit so as to be rotatable at least in two directions; and an actuator that rotates the lamp unit with respect to the support member and is disposed under the lamp unit, and to which a lower end of the lamp unit is coupled, the actuator includes: a support portion attached to the support member and having a shaft holding portion on a lower surface thereof; and a main unit being supported by the support portion so as to be movable in a front-rear direction and having a bearing portion on an upper surface thereof, a driving mechanism having a connecting shaft to which the lamp unit is coupled is provided in the main unit, and a guide shaft is provided that is inserted through the shaft holding portion of the support portion and the bearing portion of the main unit and guides the main unit when the main unit moves in the front-rear direction with respect to the support portion of the main unit.

Thus, because the means for guiding the main unit when the main unit moves in the front-rear direction is not provided so as to protrude sideward, the width in the right-left direction of the actuator can be reduced. Accordingly, the size in the right-left direction of the actuator can be reduced.

In one or more embodiments of the present invention, because two guide shafts are provided and because the two guide shafts are disposed on right and left sides of the connecting shaft of the driving mechanism, respectively, the condition of the support of the main unit through the guide shafts of the support portion is stabilized. Thus, a smooth movement in the front-rear direction of the main unit can be ensured.

In one or more embodiments of the present invention, because the support portion supports the main unit through one guide shaft, reduction in the manufacturing cost of the actuator, by reduction in the number of parts, can be attained.

In one or more embodiments of the present invention, because the support portion has a cover portion that covers the guide shaft, the adhesion of dust to the guide shaft is reduced.

Thus, a smooth movement in the front-rear direction of the main unit with respect to the support portion can be ensured in the actuator.

In one or more embodiments of the present invention, the main unit includes: the driving mechanism; a disposition case where the driving mechanism is disposed; and a lid member that is coupled to the disposition case and closes at least a part of the driving mechanism from above, a stopper protrusion that protrudes upward is provided on the disposition case, the bearing portion is provided on the lid member, a protrusion insertion hole in which the stopper protrusion is inserted from below is formed on the lid member, and when the lid member is coupled to the disposition case with the guide shaft being inserted through the shaft holding portion and the bearing portion, the stopper protrusion is inserted in the protrusion insertion hole so that the stopper protrusion abuts on or is situated close to an end surface in an axial direction of the guide shaft.

Consequently, because the movement of the guide shaft is restricted by the stopper protrusion, the guide shaft is prevented from dropping off from the disposition case and the lid member, when the lid member is coupled to the disposition case. Thus, the assembly can be simplified and expedited.

Other aspects and advantages of the present invention will be apparent from the following description, the drawings, and the claims.

DETAILED DESCRIPTION OF THE EXEMPLARY EMBODIMENTS

Hereinafter, a vehicle headlight in accordance with one or more embodiments of the present invention will be described with reference to the attached drawings (see FIGS. 1 to 9).

A vehicle headlight 1 is attached to each of the right and left ends at the front end of a vehicle.

Figure 1:
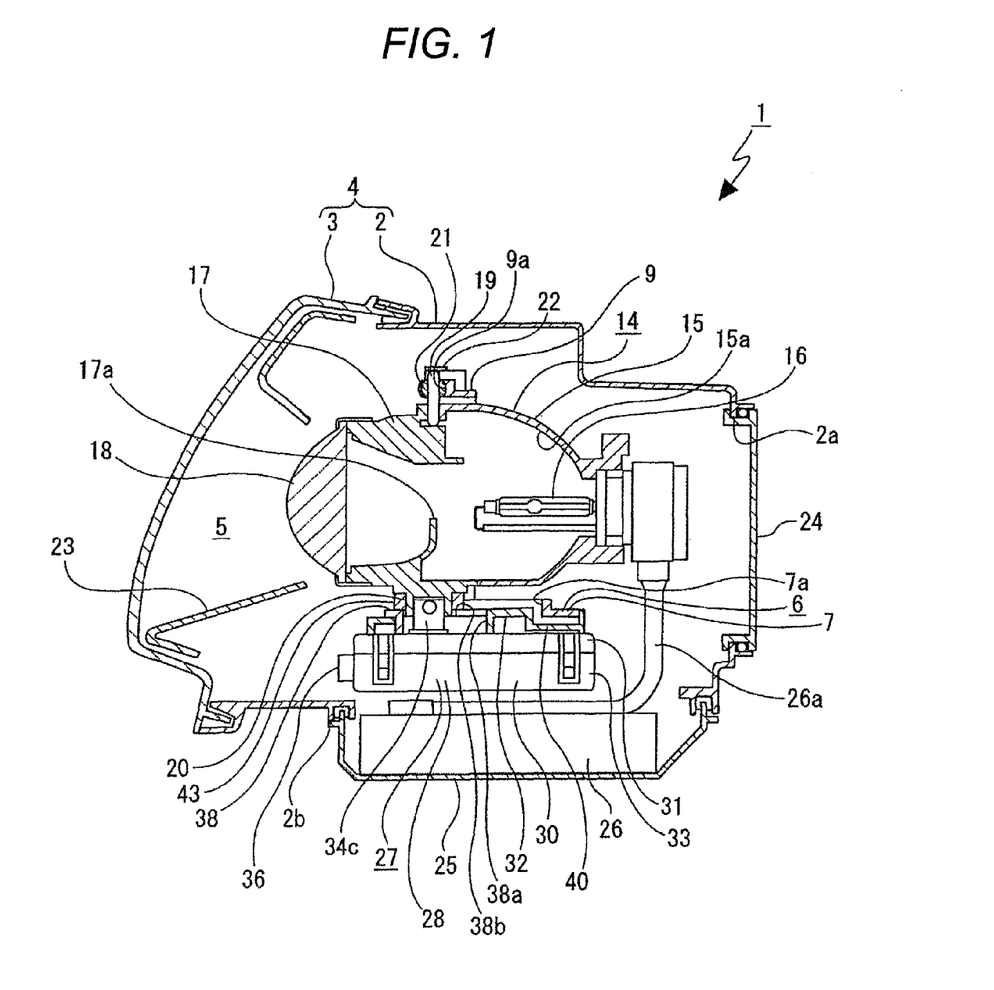
FIG. 1, as well as FIGS. 2 to 9, shows a vehicle headlight in accordance with one or more embodiments of the present invention, and is a schematic longitudinal cross-sectional view.

The vehicle headlight 1 has, as shown in FIG. 1, a lamp housing 2 having a concave portion opened on the front side and a cover 3 that closes the opening of the lamp housing 2. The lamp housing 2 and the cover 3 constitute a lighting casing 4, and the internal space of the lighting casing 4 is formed as a lighting chamber 5.

At the rear end of the lamp housing 2, an attachment opening 2a passing through in the front-rear direction is formed. At the lower end of the lamp housing 2, a disposition opening 2b passing through in the vertical direction is formed.

Figure 2:
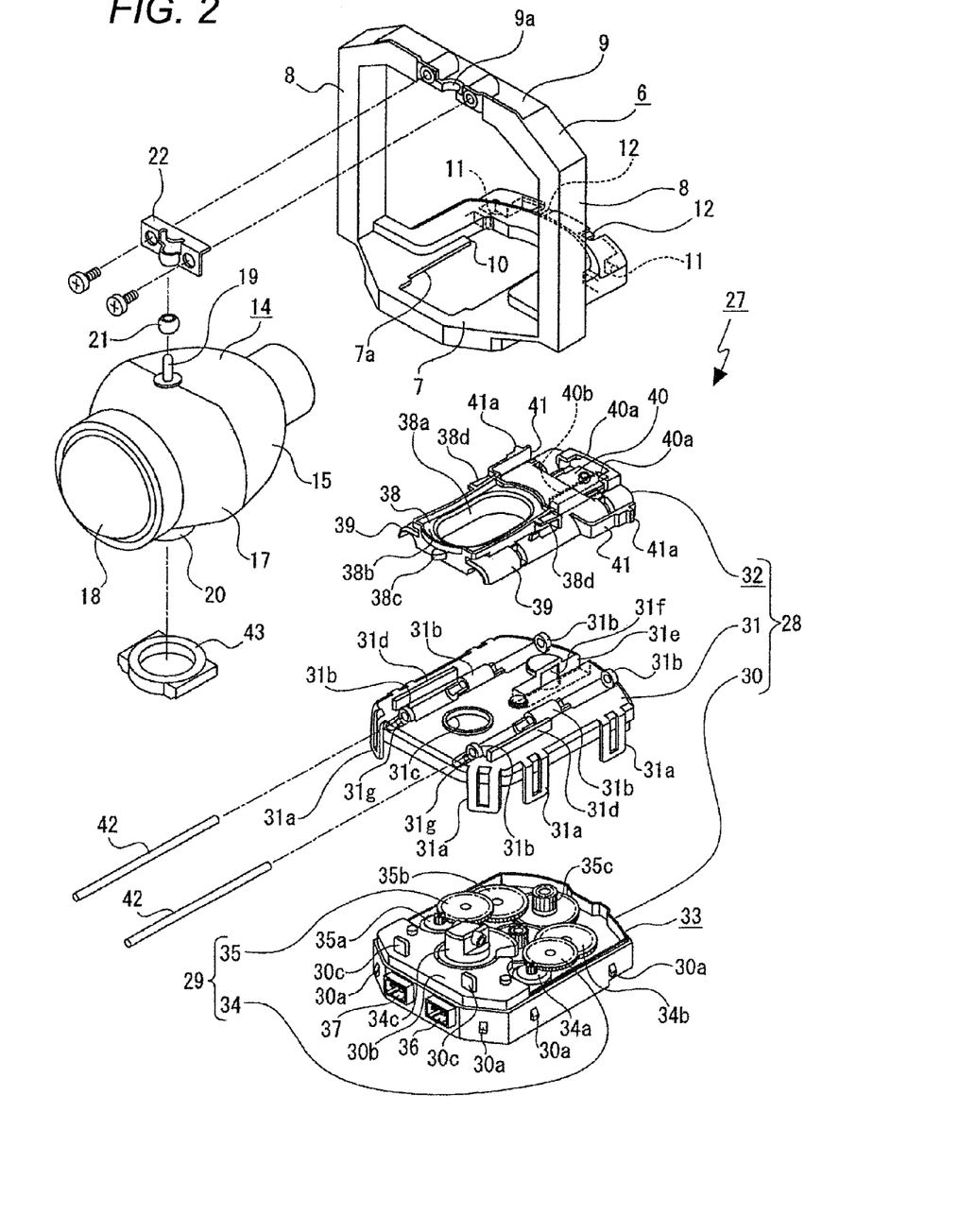
FIG. 2 is an exploded perspective view showing the internal structure with part thereof omitted.

A support member 6 is disposed in the lighting chamber 5. The support member 6 is supported so as to be tiltable in the right-left and vertical directions with respect to the lamp housing 2 by a non-illustrated aiming adjustment mechanism. The support member 6 includes, as shown in FIGS. 1 and 2, a base portion 7 oriented in the vertical direction, pillar portions 8 protruding upward from the right and left ends of the base portion 7, respectively, and a hanging portion 9 connecting the upper ends of the pillar portions 8. In a central part in the right-left direction of the hanging portion 9, a support-receiving portion 9a is formed.

Figure 3:
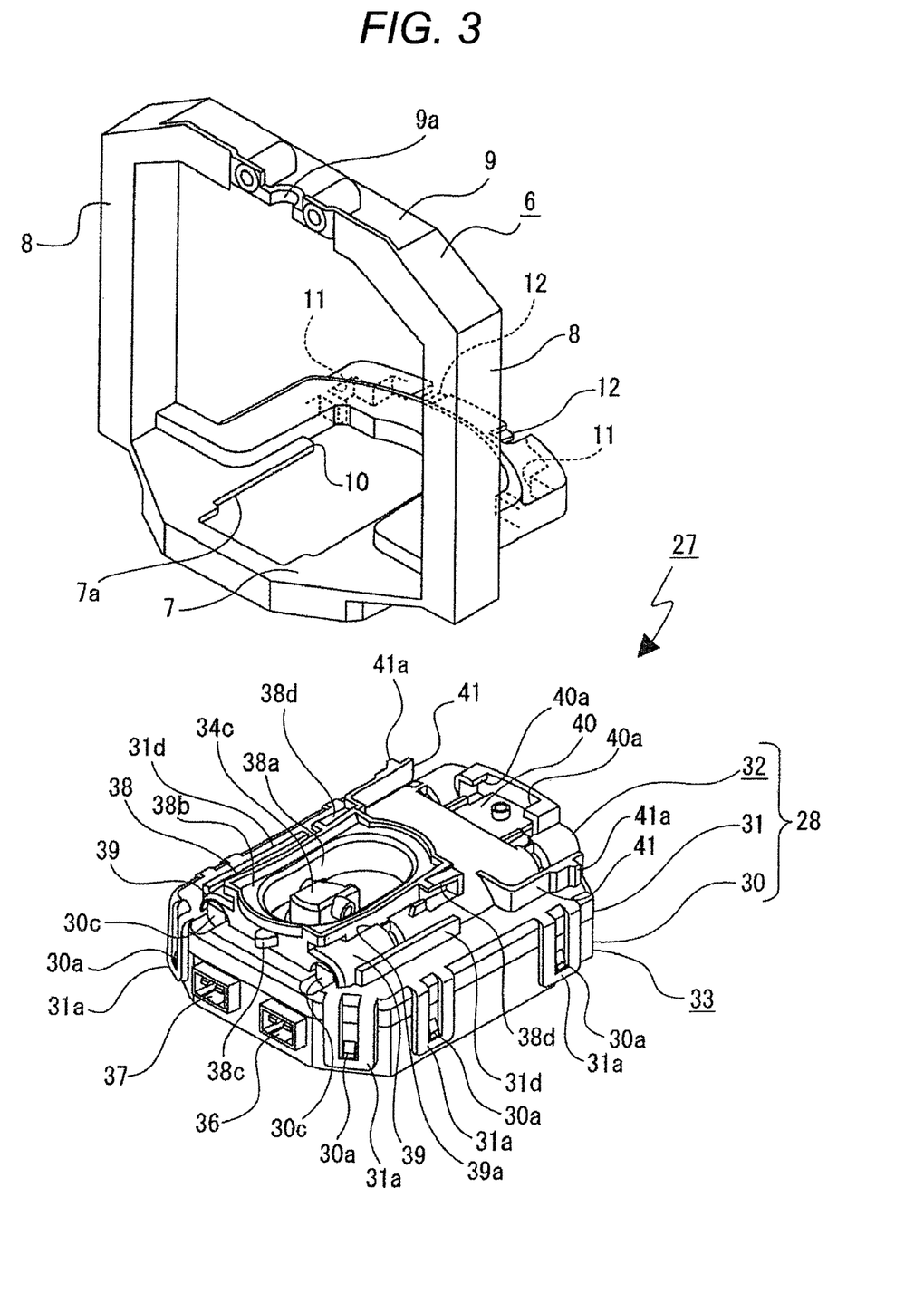
FIG. 3 is a perspective view showing the internal structure with part thereof omitted.

On the base portion 7, an attachment hole 7a passing through in the vertical direction is formed (see FIGS. 2 and 3).

Figure 4:
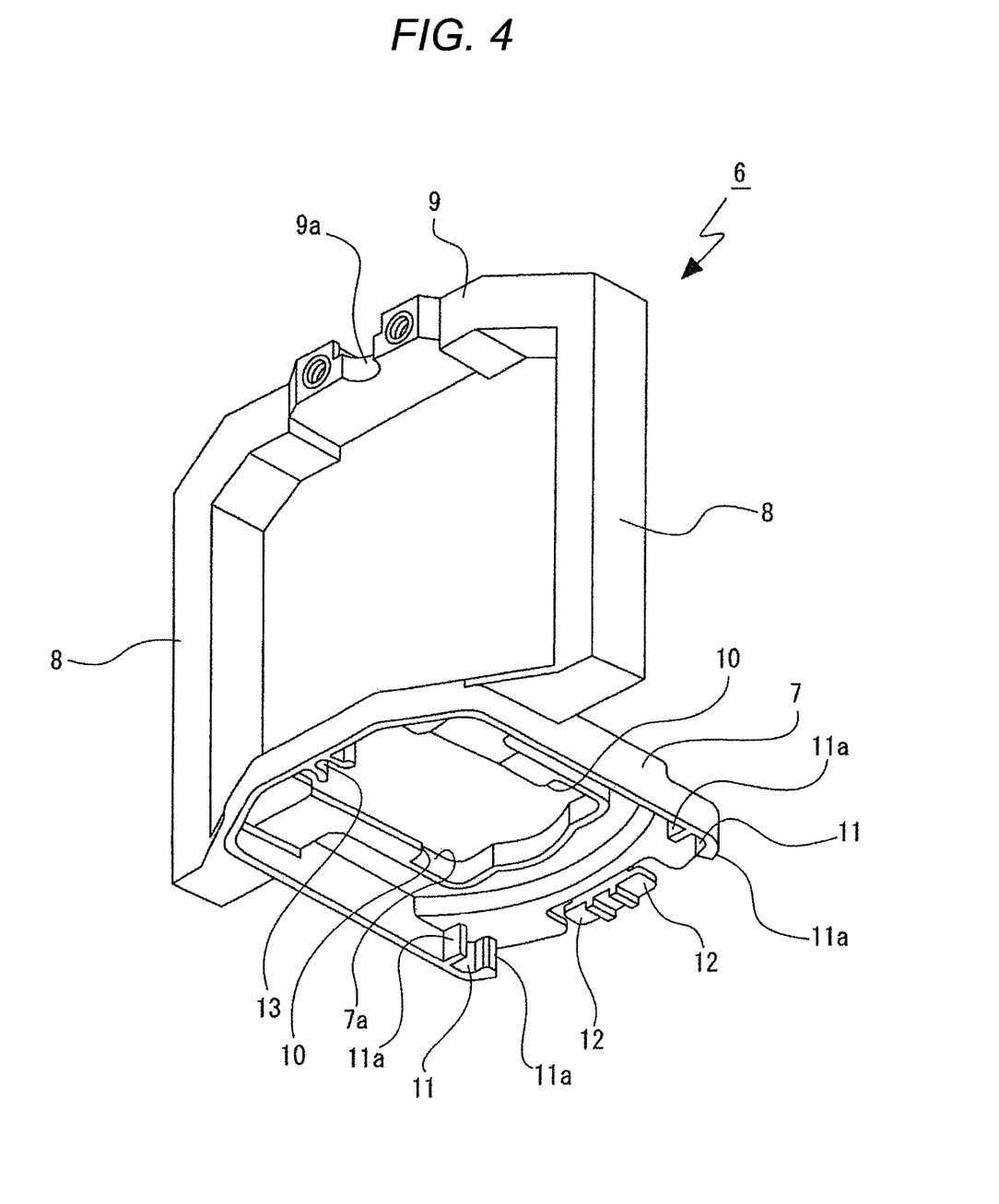
FIG. 4 is an enlarged perspective view of a support member.
Figure 5:
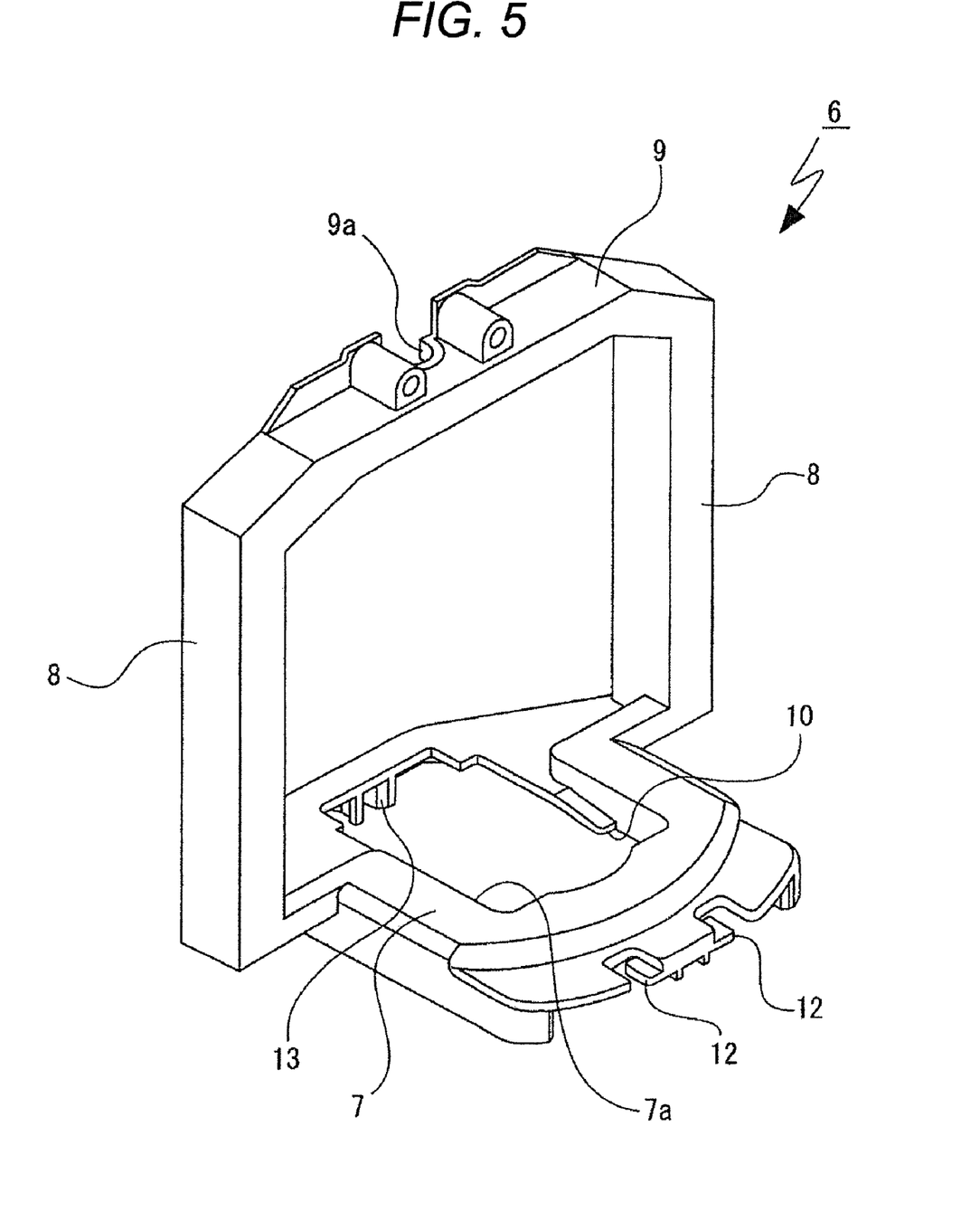
FIG. 5 is an enlarged perspective view of the support member viewed from a different direction from FIG. 4.

On the base portion 7, first support member side engagement portions 10 are provided on the right and left rims of the attachment hole 7a, respectively (see FIGS. 4 and 5). The first support member side engagement portions 10 are formed in a tongue-like shape.

At the rear end on the lower surface side of the base portion 7, second support member side engagement portions 11 are formed on the right and left ends, respectively. The second support member side engagement portions 11 are formed in a concave shape opened on the side where they are opposed to each other, i.e., the inwardly facing side. Two wall portions 11a are, respectively, separated, in the front-rear direction, from the second support member side engagement portions 11 and opposed, in the front-rear direction, to the second support member side engagement portions 11.

At the rear end of the base portion 7, third support member side engagement portions 12 are provided so as to be separated in the right-left direction. The third support member side engagement portions 12 are formed in a tongue-like shape.

At the front end on the lower surface side of the base portion 7, an engagement concave portion 13 is provided. The engagement concave portion 13 is opened on the rear side.

In the lighting chamber 5, a lamp unit 14 is disposed (see FIG. 1). The lamp unit 14 is supported by the support member 6 so as to be tiltable in the vertical direction and rotatable in the right-left direction.

The lamp unit 14 has, as shown in FIGS. 1 and 2, a reflector 15 that reflects light with an inner surface thereof, a light source 16 held at the rear end of the reflector 15, a lens holder 17 attached to the front end of the reflector 15, and a projection lens 18 held at the front end of the lens holder 17.

The reflector 15 is formed in a bowl-like shape opened on the front side, and the inner surface thereof is formed as a reflecting surface 15a. The reflecting surface 15a is a paraboloidal or an elliptical surface.

The lens holder 17 has a shade 17a, and the shade 17a is provided in a condition of protruding into the lamp unit 14. The shade 17a has the function of intercepting part of the light emitted from the light source 16.

As the light source 16, for example, a discharge lamp is used.

The lamp unit 14 is supported so as to be rotatable in the right-left direction (horizontal direction) about support shafts 19 and 20. Support shafts 19 and 20 are situated so as to be separated in the vertical direction and are provided at the upper and lower ends of the lens holder 17, respectively. The lamp unit 14 is rotated in the right-left direction in accordance with the running direction of the vehicle, and the light emitted from the light source 16 is radiated so as to follow the running direction of the vehicle.

The support shaft 19 is coupled to a spherical portion 21. The support shaft 19 is supported by the support-receiving portion 9a of the hanging portion 9 of the support member 6 by the spherical portion 21 being pressed by a pressing member 22 screwed to the hanging portion 9.

The lamp unit 14 is tiltable in the vertical direction about the spherical portion 21 by the support shaft 20 moving in the front-rear direction.

On the front end side of the lighting chamber 5, an extension 23 that shields a part of the lamp unit 14 is disposed (see FIG. 1).

To the rear end of the lamp housing 2, a back cover 24 that closes the attachment opening 2a is attached.

To the lower end of the lamp housing 2, an attachment cover 25 that closes the disposition opening 2b is attached. The attachment cover 25 is formed in a box shape opened on the upper side.

To the inside of the attachment cover 25, a discharge lamp lighter 26 is attached. The discharge lamp lighter 26 is a device for lighting the light source 16, and has a lighting circuit inside.

The discharge lamp lighter 26 is connected to the light source 16 by a cable 26a, and the cable 26a is disposed so as to range from behind to under the lamp unit 14.

Under the lamp unit 14, an actuator 27 is disposed. The actuator 27 includes a case member 28 and a driving mechanism 29 disposed in the case member 28 (see FIGS. 2 and 3).

The case member 28 includes a box-shaped disposition case 30 opened on the upper side, a lid member 31 that closes the disposition case 30, and a support portion 32 disposed over the lid member 31. The disposition case 30, the lid member 31, and the driving mechanism 29 constitute a main unit 33, and the main unit 33 is supported by the support portion 32 so as to be movable in the front-rear direction.

On the periphery of the disposition case 30, a plurality of engagement protrusions 30a are provided so as to be separated in the circumferential direction. The upper surface at the front end of the disposition case 30 is closed by a plane portion 30b, and on the plane portion 30b, stopper protrusions 30c protruding upward are provided so as to be separated in the right-left direction.

The lid member 31 is formed in a shallow box shape opened on the lower side, and a plurality of engagement pieces 31a protruding downward are provided on the periphery thereof. The engagement pieces 31a each have an engagement hole.

On the upper surface of the lid member 31, a plurality of bearing portions 31b are provided so as to be separated in the right-left direction. For example, three bearing portions 31b are provided on each of the right and left sides, and are situated so as to be separated in the front-rear direction.

In a position closer to the front end of the lid member 31, an insertion hole 31c passing through in the vertical direction is formed. On the upper surface of the lid member 31, positioning wall portions 31d extending in the front-rear direction are provided outside the bearing portions 31b, respectively.

At the rear end of the lid member 31, a disposition groove 31e passing through in the vertical direction and opened on the rear side is formed. In the wall portion forming the disposition groove 31e, an insertion groove 31f passing through in the right-left direction and opened on the lower side is formed.

At the front end of the lid member 31, protrusion insertion holes 31g passing through in the vertical direction are formed immediately before the foremost bearing portions 31b.

The driving mechanism 29 includes a swivel mechanism 34 and a leveling mechanism 35 (see FIG. 2).

The swivel mechanism 34 has a swivel motor 34a, reduction gears 34b rotated by the driving force of the swivel motor 34a, and a connecting shaft 34c rotated by receiving the driving force of the swivel motor 34a through the reduction gears 34b. The connecting shaft 34c protrudes upward from the plane portion 30b of the disposition case 30.

The leveling mechanism 35 has a leveling motor 35a, reduction gears 35b rotated by the driving force of the leveling motor 35a, and a pinion gear 35c rotated by receiving the driving force of the leveling motor 35a through the reduction gears 35b.

In the disposition case 30, a non-illustrated circuit board is disposed, and, at the front end of the circuit board, a first connector 36 and a second connector 37 are provided. The first connector 36 is for supplying power to the swivel motor 34a. The second connector 37 is for supplying power to the leveling motor 35a. The first connector 36 and the second connector 37 both partly protrude forward from the disposition case 30.

The support portion 32 of the actuator 27 is constituted by an integrated combination of a thrust receiver 38 that receives the load of the lamp unit 14, shaft support portions 39 continuously provided on the right and left sides of the thrust receiver 38, respectively, and a continuously provided portion 40 continuing from the rear side of the thrust receiver 38 and continuously provided on the inside at the rear end of the shaft support members 39.

The thrust receiver 38 is formed in a substantially rectangular shape elongated in the front-rear direction, and has a shaft insertion hole 38a passing through in the vertical direction and elongated in the front-rear direction. The upper opening rim of the shaft insertion hole 38a of the thrust receiver 38 is a slide surface 38b formed in a gentle arc surface shape that is convex downward. On the front surface of the thrust receiver 38, an engagement protrusion 38c protruding forward is provided.

At the rear end of the thrust receiver 38, tongue-shaped receiver side engagement portions 38d are provided so as to be separated in the right-left direction.

The shaft support portions 39 are elongated in the front-rear direction. On the lower surface sides of the shaft support portions 39, a plurality of shaft holding portions 39a are provided so as to be separated in the front-rear direction (see FIG. 6). The shaft holding portions 39a are formed in an annular shape.

Figure 6:
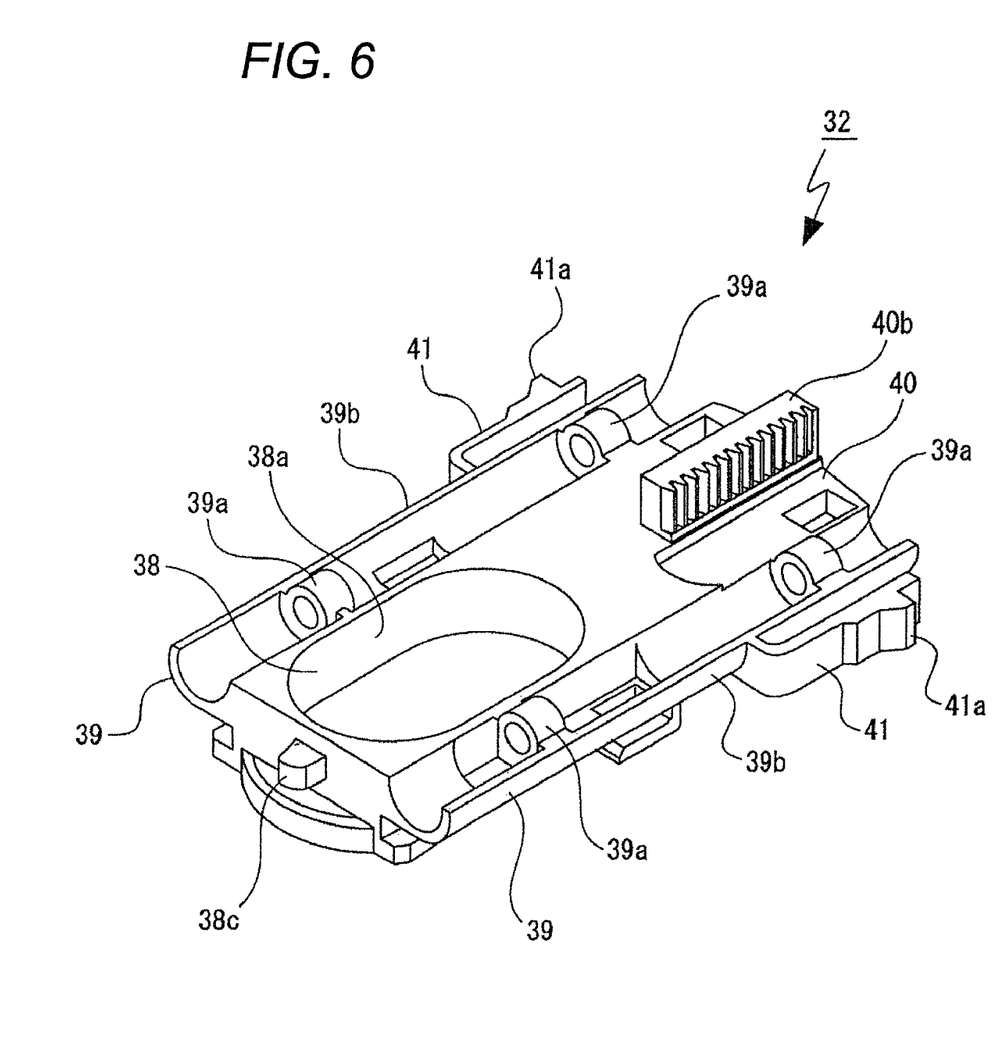
FIG. 6 is an enlarged perspective view showing the bottom surface side of the support member.

The parts of the shaft support portions 39 other than the shaft holding portions 39a are provided as cover portions 39b. The cover portions 39b are formed in an arc surface shape that is substantially convex upward.

In positions closer to the rear end of the shaft support portions 39, elastic engagement portions 41 protruding outward are provided. The elastic engagement portions 41 are each formed so as to protrude outward from the shaft support portion 39 and, then, further largely protrude rearward. The elastic engagement portions 41 have an engagement protrusion 41a protruding outward at the rear end.

On the upper surface side of the continuously provided portion 40, engagement protrusions 40a are provided so as to be separated in the right-left direction. On the lower surface side of the continuously provided portion 40, a rack 40b protruding downward and extending in the front-rear direction is provided.

Hereinafter, the assembly of the actuator 27 will be described.

The support portion 32 is placed on the upper side of the lid member 31. At this time, the positioning wall portions 31d of the lid member 31 are situated along the outside edges of the shaft support portions 39 of the support portion 32, respectively, to position the lid member 31 and the support portion 32. Under the condition where the support portion 32 is disposed on the upper side of the lid member 31, the rack 40b of the support portion 32 is inserted in the disposition groove 31e of the lid member 31.

Under the condition where the support portion 32 is disposed on the upper side of the lid member 31, guide shafts 42 are inserted into the bearing portions 31b of the lid member 31 and the shaft holding portions 39a of the support portion 32 from the front. The rear ends of the guide shafts 42 are held by the rearmost bearing portions 31b, whereby the insertion is completed.

Under the condition where the insertion into the bearing portions 31b of the lid member 31 and the shaft holding portions 39a of the support portion 32 is completed, the front ends of the guide shafts 42 are inserted in the foremost bearing portions 31b. At this time, the guide shafts 42 are blocked from above by the cover portions 39b provided on the shaft support portions 39 of the support portion 32.

Consequently, the adhesion of dust to the guide shafts 42, the bearing portions 31b and the shaft holding portions 39a is reduced by the cover portions 39b, so that a smooth movement in the front-rear direction of the main unit 33 with respect to the support portion 32 can be ensured in the actuator 27.

Then, the disposition case 30 where the driving mechanism 29 is disposed is closed from above by the lid member 31, and the engagement pieces 31a of the lid member 31 are engaged with the engagement protrusions 30a of the disposition case 30, respectively, whereby the lid member 31 is coupled to the disposition case 30.

Under the condition where the lid member 31 is coupled to the disposition case 30, the connecting shaft 34c of the swivel mechanism 34 protrudes upward out of the insertion hole 31c of the lid member 31, and the connecting shaft 34c is disposed in the shaft insertion hole 38a formed through the thrust receiver 38 of the support portion 32.

Under the condition where the lid member 31 is coupled to the disposition case 30, the pinion gear 35c of the leveling mechanism 35 partly protrudes from the insertion groove 31f into the disposition groove 31e of the lid member 31. Consequently, the pinion gear 35c is meshed with the rack 40b of the support portion 32 inserted in the disposition groove 31e.

Figure 7:
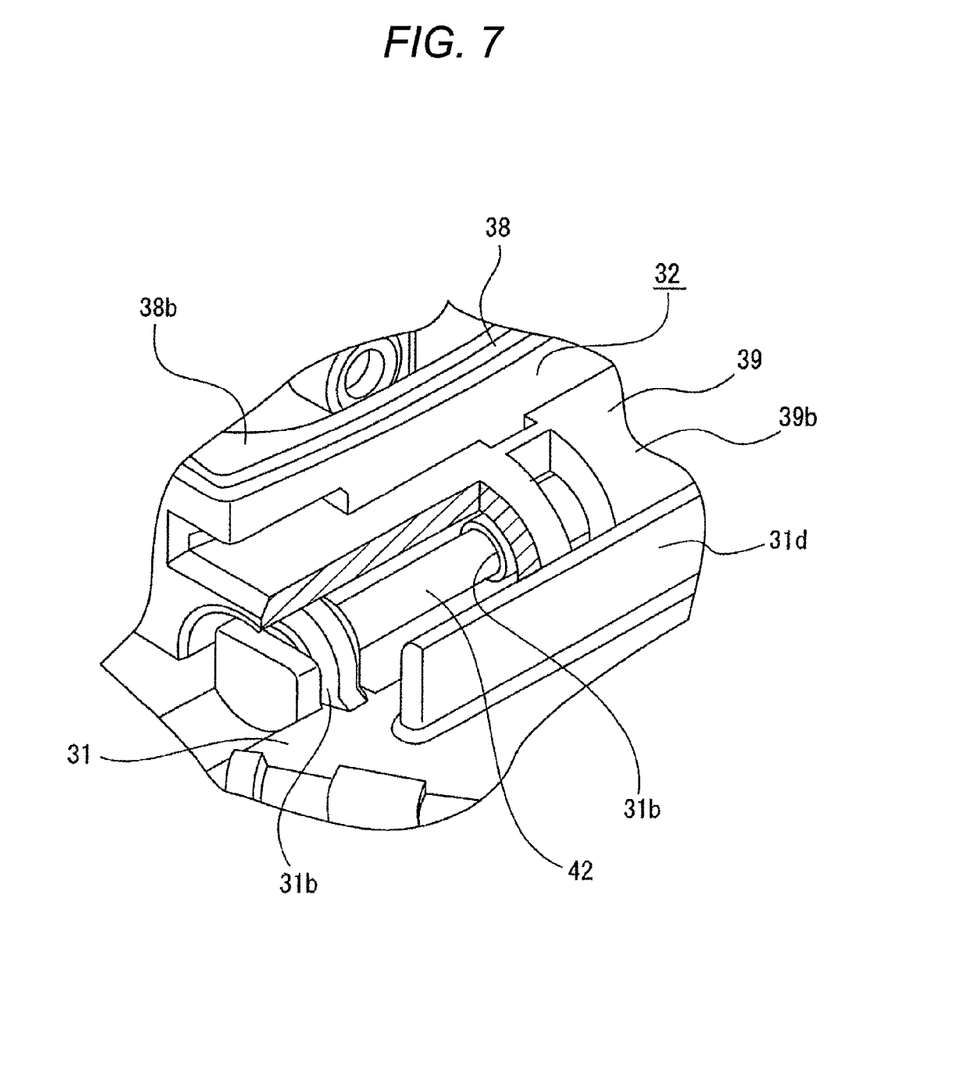
FIG. 7 is an enlarged perspective view showing a condition where guide shafts are prevented from dropping off by stopper protrusions.

Further, when the lid member 31 is coupled to the disposition case 30, as shown in FIG. 7, the stopper protrusions 30c provided on the plane portion 30b of the disposition case 30 are inserted into the protrusion insertion holes 31g of the lid member 31 from below so as to abut on, or to be situated close to, the front surfaces of the guide shafts 42, so that the forward movements of the guide shafts 42 are restricted by the stopper protrusions 30c.

Consequently, in the actuator 27, when the lid member 31 is coupled to the disposition case 30, the forward movements of the guide shafts 42 are restricted by the stopper protrusions 30c at the same time to thereby prevent the guide shafts 42 from dropping off from the disposition case 30 and the lid member 31, so that the assembly can be simplified and expedited.

Moreover, because the stopper protrusions 30c are provided on the disposition case 30, no additional part is required that is specifically provided for preventing the guide shafts 42 from dropping off from the disposition case 30 and the lid member 31. Thus, reduction in manufacturing cost by reduction in the number of parts of the actuator 27 can be attained.

The assembly of the actuator 27 is completed as described above, so that the main unit 33 having the disposition case 30 and the lid member 31 is supported so as to be movable in the front-rear direction by the support portion 32 through the guide shafts 42.

The support shaft 20 of the lamp unit 14 is inserted in a washer 43. The lower surface of the washer 43 is formed in a gentle arc surface shape that is convex downward, in correspondence with the slide surface 38b of the thrust receiver 38.

Next, the attachment of the actuator 27 to the support member 6 will be described (see FIGS. 8 and 9). For simplification, as the actuator 27, only the support portion 32 is shown in FIGS. 8 and 9.

First, the upper end of the support portion 32 of the actuator 27 is inserted into the attachment hole 7a of the support member 6 from below.

Figure 8:
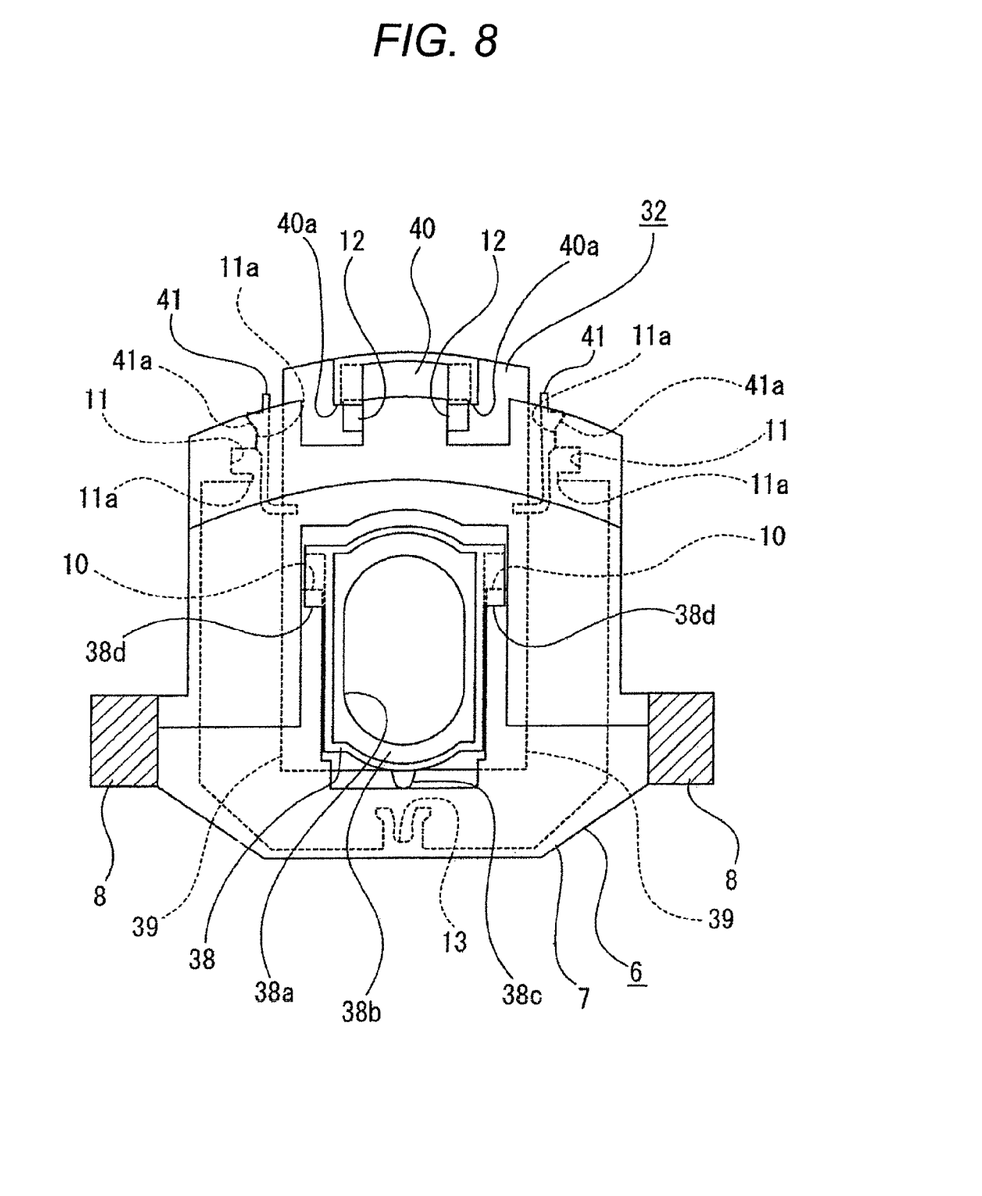
FIG. 8 is a schematic plan view showing, partly in cross section, a condition where an actuator is in the process of being attached to the support member.
Figure 9:
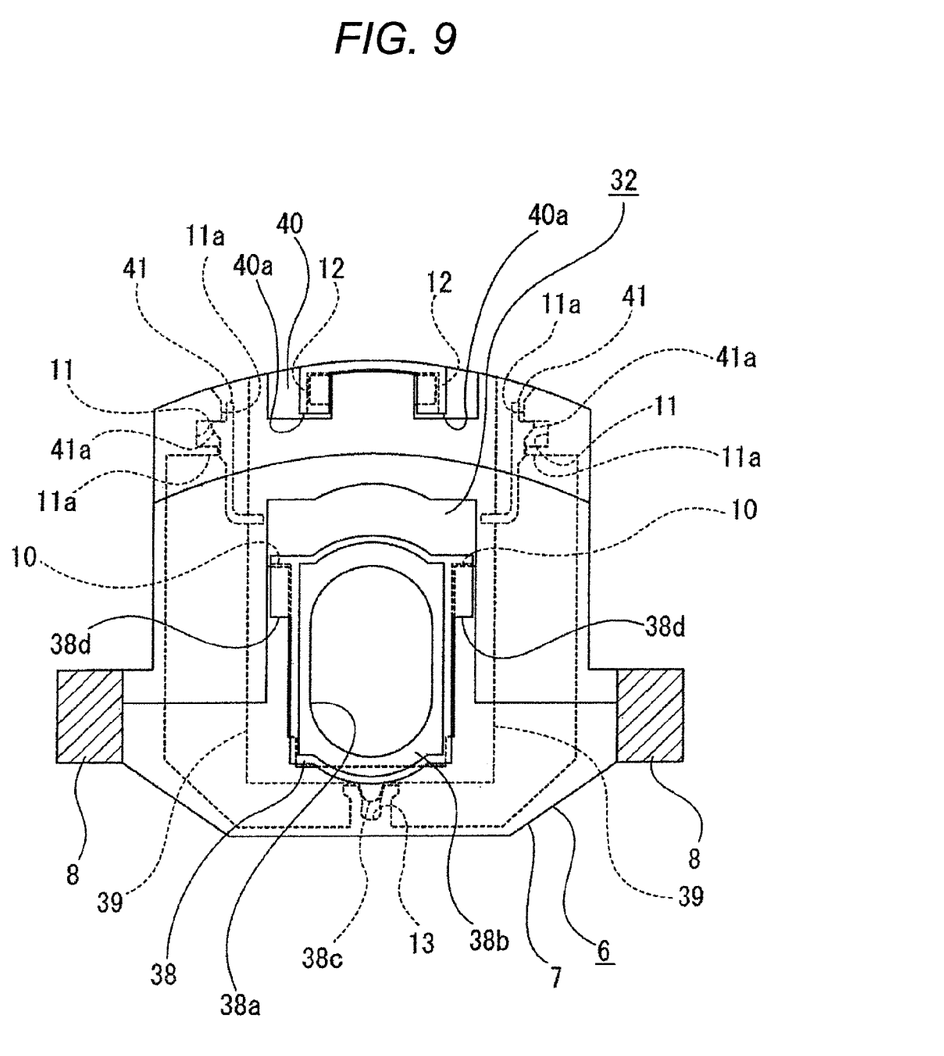
FIG. 9 is a schematic plan view showing, partly in cross section, a condition where the actuator is attached to the support member.

Then, the actuator 27 is moved forward with respect to the support member 6, the receiver side engagement portions 38d are engaged with the first support member side engagement portions 10 from above, and the engagement portions 40a are engaged with the third support member side engagement portions 12 from above (see FIG. 8).

Then, the actuator 27 is further moved forward with respect to the support member 6. The receiver side engagement portions 38d are continuously engaged with the first support member side engagement portions 10 from above, and the engagement portions 40a are continuously engaged with the third support member side engagement portions 12 from above. At this time, the engagement protrusions 41a of the elastic engagement portions 41 are slid on the wall portions 11a on the rear side constituting the second support member side engagement portions 11 of the support member 6, so that the elastic engagement portions 41 are elastically deformed. Then, the elastic engagement portions 41 are elastically returned, so that the engagement protrusions 41a are engaged with the second support member side engagement portions 11 (see FIG. 9). At the same time, the engagement protrusion 38c of the actuator 27 is engaged with the engagement concave portion 13 of the support member 6.

As described above, the receiver side engagement portions 38d are engaged with the first support member side engagement portions 10 from above, the engagement protrusions 40a are engaged with the third support member side engagement portions 12 from above, the engagement protrusions 41a of the elastic engagement portions 41 are engaged with the second support member side engagement portions 11, and the engagement protrusion 38c is engaged with the engagement concave portion 13 of the support member 6, whereby the attachment of the actuator 27 to the support member 6 is completed.

Under the condition where the actuator 27 is attached to the support member 6, the support shaft 20 under the lamp unit 14 is coupled to the connecting shaft 34c on the driving mechanism 29 of the actuator 27 in a condition of being inserted in the washer 43. Under the condition where the support shaft 20 is coupled to the connecting shaft 34c, the lower surface of the washer 43 is slidable on the slide surface 38b of the thrust receiver 38 of the actuator 27.

Under the condition where the lamp unit 14 is coupled to the actuator 27 as described above, when the swivel motor 34a is rotated, the driving force of the swivel motor 34a is transmitted to the lamp unit 14 through the connecting shaft 34c, so that the lamp unit 14 is rotated about the support shafts 19 and 20 in the right-left direction in accordance with the rotation direction of the swivel motor 34a to perform the swivel operation.

When the leveling motor 35a is rotated, the driving force of the leveling motor 35a is transmitted to the rack 40b through the pinion gear 35c. When the driving force of the leveling motor 35a is transmitted to the rack 40b, the main unit 33 is moved in the front-rear direction in accordance with the rotation direction of the leveling motor 35a with respect to the support portion 32 by being guided by the guide shafts 42, and the lamp unit 14 is tilted about the spherical portion 21 in the vertical direction with the movement of the main unit 33 to perform the leveling operation.

As described above, in the vehicle headlight 1, the shaft holding portions 39a are provided on the lower surface of the support portion 32, the bearing portions 31b are provided on the upper surface of the main unit 33, and when the main unit 33 is moved in the front-rear direction with respect to the support portion 32, the main unit 33 is guided by the guide shafts 42 inserted in the shaft holding portions 39a and the bearing portions 31b.

Thus, because the means for guiding the main unit 33 when the main unit moves in the front-rear direction is not provided so as to protrude sideward (outward), the width in the right-left direction of the actuator 27 can be reduced, so that the size in the right-left direction of the actuator 27 can be reduced.

Moreover, because the guide shafts 42 are disposed on the right and left sides of the connecting shaft 34c which is the connection part of the lamp unit 14, the condition of the support of the main unit 33 through the guide shafts 42 of the support portion 32 is stabilized. Thus, a smooth movement in the front-rear direction of the main unit 33 can be ensured.

While an example in which two guide shafts 42 functioning as the means for guiding the main unit 33 are provided is shown above, the number is not limited to two, but, instead, an arbitrary number of guide shafts 42 may be provided.

For example, the main unit 33 may be guided by one guide shaft 42. In such a case, to stabilize the condition of the support of the main unit 33 through the guide shaft 42 of the support portion 32, it is desirable to dispose the guide shaft 42 in a central part in the right-left direction of the actuator 27.

By adopting the structure in which the main unit 33 is guided by one guide shaft 42, reduction in the manufacturing cost of the actuator 27 by reduction in the number of parts can be attained.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

EXPLANATION OF REFERENCE NUMERALS

1: Vehicle headlight;
2: lamp housing;
3: cover;
4: lighting casing;
6: support member;
14: lamp unit;
15: reflector;
16: light source;
27: actuator;
28: case member;
29: driving mechanism;
30: disposition case;
30c: stopper protrusion;
31: lid member;
31b: bearing portion;
31g: protrusion insertion hole;
32: support portion;
33: main unit;
34c: connecting shaft;
39a: shaft holding portion;
39b: cover portion;
42: guide shaft.

What is claimed is:

1. A vehicle head light comprising:
a lighting casing comprising a lamp housing opened on one side and a cover that closes the opening of the lamp housing;
a lamp unit disposed in the lighting casing;
a support member that supports the lamp unit so as to be rotatable at least in two directions; and
an actuator that rotates the lamp unit with respect to the support member,
wherein the actuator is disposed under the lamp unit,
wherein a lower end of the lamp unit is coupled to the actuator,
wherein the actuator comprises:
a support portion attached to the support member, the support portion comprising a shaft holding portion on a lower surface thereof; and
a main unit being supported by the support portion so as to be movable in a front-rear direction, the main unit comprising a bearing portion on an upper surface thereof,
wherein a driving mechanism is provided in the main unit, the driving mechanism comprising a connecting shaft to which the lamp unit is coupled,
wherein a guide shaft is inserted through the shaft holding portion of the support portion and the bearing portion of the main unit, and
wherein the guide shaft guides the main unit when the main unit moves in the front-rear direction with respect to the support portion of the main unit.

2. The vehicle head light according to claim 1, wherein two said guide shafts are provided, and
wherein the two guide shafts are disposed on right and left sides of the connecting shaft of the driving mechanism, respectively.

3. The vehicle headlight according to claim 1, wherein the support portion supports the main unit through one guide shaft.

4. The vehicle headlight according to claim 1, wherein the support portion has a cover portion that covers the guide shaft.

5. The vehicle headlight according to claim 1, wherein the main unit comprises:
the driving mechanism;
a disposition case where the driving mechanism is disposed; and
a lid member that is coupled to the disposition case and closes at least a part of the driving mechanism from above,
wherein a stopper protrusion that protrudes upward is provided on the disposition case,
wherein the bearing portion is provided on the lid member,
wherein a protrusion insertion hole in which the stopper protrusion is inserted from below is formed on the lid member, and
wherein, when the lid member is coupled to the disposition case with the guide shaft being inserted through the shaft holding portion and the bearing portion, the stopper protrusion is inserted in the protrusion insertion hole so that the stopper protrusion abuts on or is situated close to an end surface in an axial direction of the guide shaft.

6. The vehicle headlamp according to claim 1, wherein the lamp unit comprises a light source and a reflector that reflects light emitted from the light source.

7. The vehicle headlight according to claim 2, wherein the support portion has a cover portion that covers the guide shaft.

8. The vehicle headlight according to claim 3, wherein the support portion has a cover portion that covers the guide shaft.

9. The vehicle headlight according to claim 2, wherein the main unit comprises:
    the driving mechanism;
    a disposition case where the driving mechanism is disposed; and
    a lid member that is coupled to the disposition case and closes at least a part of the driving mechanism from above,
    wherein a stopper protrusion that protrudes upward is provided on the disposition case,
    wherein the bearing portion is provided on the lid member,
    wherein a protrusion insertion hole in which the stopper protrusion is inserted from below is formed on the lid member, and
    wherein, when the lid member is coupled to the disposition case with the guide shaft being inserted through the shaft holding portion and the bearing portion, the stopper protrusion is inserted in the protrusion insertion hole so that the stopper protrusion abuts on or is situated close to an end surface in an axial direction of the guide shaft.

10. The vehicle headlight according to claim 3, wherein the main unit comprises:
    the driving mechanism;
    a disposition case where the driving mechanism is disposed; and
    a lid member that is coupled to the disposition case and closes at least a part of the driving mechanism from above,
    wherein a stopper protrusion that protrudes upward is provided on the disposition case,
    wherein the bearing portion is provided on the lid member,
    wherein a protrusion insertion hole in which the stopper protrusion is inserted from below is formed on the lid member, and
    wherein, when the lid member is coupled to the disposition case with the guide shaft being inserted through the shaft holding portion and the bearing portion, the stopper protrusion is inserted in the protrusion insertion hole so that the stopper protrusion abuts on or is situated close to an end surface in an axial direction of the guide shaft.

11. The vehicle headlight according to claim 4, wherein the main unit comprises:
    the driving mechanism;
    a disposition case where the driving mechanism is disposed; and
    a lid member that is coupled to the disposition case and closes at least a part of the driving mechanism from above,
    wherein a stopper protrusion that protrudes upward is provided on the disposition case,
    wherein the bearing portion is provided on the lid member,
    wherein a protrusion insertion hole in which the stopper protrusion is inserted from below is formed on the lid member, and
    wherein, when the lid member is coupled to the disposition case with the guide shaft being inserted through the shaft holding portion and the bearing portion, the stopper protrusion is inserted in the protrusion insertion hole so that the stopper protrusion abuts on or is situated close to an end surface in an axial direction of the guide shaft.

* * * * *